US009732229B2

(12) United States Patent
Delst et al.

(10) Patent No.: US 9,732,229 B2
(45) Date of Patent: Aug. 15, 2017

(54) DIFFRACTIVE PIGMENT BLEND AND COMPOSITION

(71) Applicant: Viavi Solutions Inc., Milpitas, CA (US)

(72) Inventors: Cornelis Jan Delst, Fairfax, CA (US); Alberto Argoitia, Santa Rosa, CA (US)

(73) Assignee: Viavi Solutions, Inc., Milpitas, CA (US)

( * ) Notice: Subject to any disclaimer, the term of this patent is extended or adjusted under 35 U.S.C. 154(b) by 720 days.

(21) Appl. No.: 13/665,203

(22) Filed: Oct. 31, 2012

(65) Prior Publication Data

US 2013/0107368 A1    May 2, 2013

Related U.S. Application Data

(60) Provisional application No. 61/553,748, filed on Oct. 31, 2011.

(51) Int. Cl.
*G02B 5/18* (2006.01)
*C09C 1/00* (2006.01)

(52) U.S. Cl.
CPC .......... *C09C 1/0024* (2013.01); *C09C 1/0081* (2013.01); *C09C 2210/30* (2013.01); *C09C 2220/20* (2013.01)

(58) Field of Classification Search
CPC . C09C 1/0024; C09C 1/0081; C09C 2220/20; C09C 2210/30; C09C 1/0015; C09C 1/0051; C09C 1/0021; C09C 2200/301; C09C 2200/1054;
(Continued)

(56) References Cited

U.S. PATENT DOCUMENTS

| 5,059,245 A | 10/1991 | Phillips et al. ............ 106/31.65 |
| 5,569,535 A | 10/1996 | Phillips et al. ............... 428/403 |
| 5,989,626 A | 11/1999 | Coombs et al. ............... 427/162 |

(Continued)

FOREIGN PATENT DOCUMENTS

| CN | 1656180 A | 8/2005 |
| CN | 168860 A | 10/2005 |

(Continued)

OTHER PUBLICATIONS

European Examination Report of corresponding European Patent Application No. 12190668.9 mailed on Jun. 6, 2016.
(Continued)

*Primary Examiner* — Scott J Sugarman
*Assistant Examiner* — Mustak Choudhury
(74) *Attorney, Agent, or Firm* — Harrity & Harrity, LLP (57) ABSTRACT

A diffractive pigment blend or composition is provided which includes a plurality of groups of all-dielectric diffractive pigment flakes. The pigment flakes of each group each include one or more dielectric layers for providing a background color, at least one of which includes a diffractive structure for providing a diffractive effect. Each group of pigment flakes provides a different diffractive effect, and the diffractive pigment blend or composition provides a combined diffractive effect that is a combination of the different diffractive effects. The combined diffractive effect may be a neutral white diffractive effect or may include a reversal in color travel.

20 Claims, 8 Drawing Sheets
(6 of 8 Drawing Sheet(s) Filed in Color)

(58) Field of Classification Search
CPC . C09C 1/0078; C09C 2210/40; C09C 1/0018; C09C 2200/1008
USPC ......... 359/558, 566–576; 428/402–405, 457; 427/248.1, 250, 569; 430/110.3
See application file for complete search history.

(56) References Cited

U.S. PATENT DOCUMENTS

| | | | |
|---|---|---|---|
| 6,524,381 B1 | 2/2003 | Phillips et al. | 106/417 |
| 6,692,830 B2 | 2/2004 | Argoitia et al. | 428/403 |
| 6,749,777 B2 | 6/2004 | Argoitia et al. | 252/582 |
| 6,749,936 B2 | 6/2004 | Argoitia et al. | 428/402 |
| 6,815,065 B2 * | 11/2004 | Argoitia | C09C 1/0015 359/566 |
| 6,841,238 B2 | 1/2005 | Argoitia et al. | 428/323 |
| 6,902,807 B1 | 6/2005 | Argoitia et al. | 428/403 |
| 7,238,424 B2 | 7/2007 | Raksha et al. | 428/403 |
| 7,729,026 B2 | 6/2010 | Argoitia et al. | 359/2 |
| 2006/0014017 A1 | 1/2006 | Pilotek et al. | |
| 2007/0259182 A1 * | 11/2007 | Bujard | B82Y 30/00 428/405 |

FOREIGN PATENT DOCUMENTS

| | | | |
|---|---|---|---|
| WO | 2003102084 A1 | 12/2003 | |
| WO | 2004/044059 | 5/2004 | C09C 1/00 |
| WO | 2004044059 A1 | 5/2004 | |
| WO | 2006/038120 | 4/2006 | B42D 15/00 |
| WO | 2006038120 A1 | 4/2006 | |

OTHER PUBLICATIONS

Chinese Examination Report of corresponding Chinese Patent Application No. 201210429202.9 mailed on Jan. 5, 2016.

* cited by examiner

DIFFRACTIVE PIGMENT BLEND AND COMPOSITION

CROSS-REFERENCE TO RELATED APPLICATIONS

This application claims priority from U.S. Provisional Patent Application No. 61/533,748 to Delst et al., filed on Oct. 31, 2011, which is incorporated herein by reference for all purposes.

TECHNICAL FIELD OF THE INVENTION

The present invention relates to diffractive pigment blends and compositions including diffractive pigment flakes, more particularly, all-dielectric diffractive pigment flakes.

BACKGROUND OF THE INVENTION

Pigment compositions including all-dielectric pigment flakes are, generally, substantially transparent, allowing overprinting. Such pigment compositions may be coated over an image or an underlying color, so that the image or the underlying color may be seen through the pigment compositions. In contrast, pigment compositions including conventional metal-dielectric pigment flakes, e.g., Fabry-Perot-type pigment flakes, may dull or obscure the image or underlying color.

Pigment compositions that are both chromatic and substantially transparent may be formed by using chromatic all-dielectric pigment flakes. For example, chromatic all-dielectric pigment flakes may include alternating layers of a high-index dielectric material and a low-index dielectric material, i.e., a dichroic stack. As a result of thin-film interference, a particular color component of light incident on such a pigment flake is reflected by the dielectric layers and another color component is transmitted, so that the pigment flake appears to have a color referred to as a background color. In other words, the dielectric layers provide a background color. Examples of chromatic all-dielectric pigment flakes are disclosed in U.S. Pat. No. 7,238,424 to Raksha, et al., issued on Jul. 3, 2007, in U.S. Pat. No. 6,524,381 to Phillips, et al., issued on Feb. 25, 2003, in U.S. Pat. No. 5,569,535 to Phillips, et al., issued on Oct. 29, 1996, and in U.S. Pat. No. 5,059,245 to Phillips, et al., issued on Oct. 22, 1991, which are incorporated herein by reference.

Pigment compositions that are both diffractive and substantially transparent may be formed by using all-dielectric diffractive pigment flakes. For example, all-dielectric diffractive pigment flakes may include at least one dielectric layer including a diffractive structure, e.g., a diffraction grating. Light incident on such a pigment flake is diffracted into its color components, i.e., angularly dispersed according to wavelength, by the diffractive structure, so that the pigment flake appears to have different colors at different viewing angles, which is referred to as a diffractive effect. In other words, the diffractive structure provides a diffractive effect. Examples of all-dielectric diffractive pigment flakes are disclosed in U.S. Pat. No. 6,815,065 to Argoitia, et al., issued on Nov. 9, 2004, which is incorporated herein by reference.

In some instances, an achromatic diffractive pigment composition providing a white, i.e., color-neutral, background color and a white diffractive effect is desirable. The neutral white background color substantially preserves the underlying color of an object coated with the pigment composition, and the neutral white diffractive effect exhibits essentially all colors of the rainbow at different viewing angles over the underlying color. An example of an achromatic all-dielectric pigment flake providing a white background color and a white diffractive effect is disclosed in U.S. Pat. No. 6,815,065. However, this pigment flake has a relatively complex optical design requiring several different layer thicknesses.

Achromatic diffractive pigment compositions including conventional metal-dielectric pigment flakes, generally, provide a gray or black background color and an iridescent diffractive effect. Examples of achromatic diffractive metal-dielectric pigment flakes are disclosed in U.S. Pat. No. 6,749,936 to Argoitia, et al., issued on Jun. 15, 2004, in U.S. Pat. No. 6,749,777 Argoitia, et al., issued on Jun. 15, 2004, and in U.S. Pat. No. 6,692,830 to Argoitia, et al., issued on Feb. 17, 2004, which are incorporated herein by reference. Examples of chromatic diffractive metal-dielectric pigment flakes are disclosed in U.S. Pat. No. 6,902,807 to Argoitia, et al., issued on Jun. 7, 2005, and in U.S. Pat. No. 6,841,238 to Argoitia, et al., issued on Jan. 11, 2005, which are incorporated herein by reference.

SUMMARY OF THE INVENTION

The present invention relates to a diffractive pigment composition comprising: a pigment medium; and a plurality of groups of all-dielectric diffractive pigment flakes blended and dispersed in the pigment medium, wherein the all-dielectric diffractive pigment flakes of each group each include one or more dielectric layers for providing a background color, and wherein at least one of the one or more dielectric layers includes a diffractive structure for providing a diffractive effect; wherein each group of all-dielectric diffractive pigment flakes provides a different diffractive effect; and wherein the diffractive pigment composition provides a combined diffractive effect that is a combination of the different diffractive effects provided by the groups of all-dielectric diffractive pigment flakes.

The present invention also relates to a diffractive pigment blend comprising: a plurality of groups of all-dielectric diffractive pigment flakes, wherein the all-dielectric diffractive pigment flakes of each group each include one or more dielectric layers for providing a background color, and wherein at least one of the one or more dielectric layers includes a diffractive structure for providing a diffractive effect; wherein each group of all-dielectric diffractive pigment flakes provides a different diffractive effect; and wherein the diffractive pigment blend provides a combined diffractive effect that is a combination of the different diffractive effects provided by the groups of all-dielectric diffractive pigment flakes.

In some embodiments, the combined diffractive effect provided by the diffractive pigment composition or blend is a neutral white diffractive effect. In other embodiments, the combined diffractive effect includes a reversal in color travel. Such and similar combined diffractive effects are, generally, difficult to achieve with a single group of all-dielectric diffractive pigment flakes.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present invention will be described in greater detail with reference to the accompanying drawings wherein.

DETAILED DESCRIPTION OF THE INVENTION

The present invention provides diffractive pigment blends and compositions that are formed by mixing different types of all-dielectric diffractive pigment flake providing different diffractive effects. Advantageously, the diffractive pigment blends and compositions provide a combined diffractive effect that is a combination of the different diffractive effects.

The all-dielectric diffractive pigment flakes, generally, have an aspect ratio of at least 2:1 and an average particle size of about 5 μm to about 200 μm, depending on the chosen coating application. The pigment flakes may be single-layer or multilayer flakes. The pigment flakes each include one or more dielectric layers, typically, thin-film dielectric layers. Usually, the pigment flakes each consist of one or more dielectric layers. Preferably, the pigment flakes each include or consist of a plurality of dielectric layers.

The one or more dielectric layers may be formed of any suitable dielectric material. Typically, the dielectric material is substantially transparent. Also typically, the dielectric material is an inorganic material. Alternatively, the dielectric material may be an organic or organic-inorganic material. The dielectric material may be a high-index dielectric material, having a refractive index of greater than about 1.65, or a low-index dielectric material, having a refractive index of less than about 1.65.

Non-limiting examples of suitable high-index dielectric materials include zinc sulfide (ZnS), zinc oxide (ZnO), zirconium oxide ($ZrO_2$), titanium dioxide ($TiO_2$), diamond-like carbon, indium oxide ($In_2O_3$), indium tin oxide (ITO), tantalum pentoxide ($Ta_2O_5$), cerium oxide ($CeO_2$), yttrium oxide ($Y_2O_3$), europium oxide ($Eu_2O_3$), iron oxides such as iron(II,III) oxide ($Fe_3O_4$) and iron(III) oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon, silicon monoxide (SiO), selenium trioxide ($Se_2O_3$), tin oxide ($SnO_2$), tungsten trioxide ($WO_3$), combinations thereof, and the like. Other examples of suitable high-index dielectric materials include mixed oxides such as those described in U.S. Pat. No. 5,989,626 to Coombs et al., issued on Nov. 23, 1999, which is incorporated herein by reference. When the dielectric materials of U.S. Pat. No. 5,989,626 are used in dielectric layers, they are most commonly oxidized to their stoichiometric state such as $ZrTiO_4$. Non-limiting examples of such mixed oxides include zirconium titanium oxide, niobium titanium oxide, combinations thereof, and the like.

Non-limiting examples of suitable low-index dielectric materials include silicon dioxide ($SiO_2$), aluminum oxide ($Al_2O_3$), metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g., $Na_3AlF_6$ or $Na_5Al_3F_{14}$), neodymium fluoride ($NdF_3$), samarium fluoride ($SmF_3$), barium fluoride ($BaF_2$), calcium fluoride ($CaF_2$), lithium fluoride (LiF), combinations thereof, and the like. Other examples of suitable low-index dielectric materials include organic monomers and polymers, including alkenes such as dienes, acrylates (e.g., methacrylate), perfluoroalkenes, polytetrafluoroethylene (Teflon), fluorinated ethylene propylene (FEP), combinations thereof, and the like.

It should be appreciated that several of the above-listed dielectric materials are typically present in non-stoichiometric forms, often depending upon the specific method used to deposit the dielectric material as a coating layer, and that the above-listed compound names indicate an approximate stoichiometry. For example, silicon monoxide and silicon dioxide have nominal silicon:oxygen ratios of 1:1 and 1:2, respectively, but the actual silicon:oxygen ratio of a particular coating layer may vary somewhat from these nominal values. Such non-stoichiometric dielectric materials are also within the scope of the present invention.

In some instances, the dielectric material is an absorbing dielectric material that selectively absorbs a particular color band in the visible spectrum, such as an absorbing metal compound, e.g., a metal oxide, nitride, carbide, or sulfide, a cermet, a dielectric material including radiation-induced color centers, a combination thereof, or the like. Non-limiting examples of suitable absorbing metal compounds include titanium suboxides ($TiO_x$), chromium oxides (e.g., $Cr_2O_3$), iron oxides (e.g., $Fe_2O_3$), cobalt oxides (e.g., CoO), silicon monoxide (SiO), titanium nitride (TiN), titanium carbide (TiC), titanium carbonitride ($TiC_xN_{1-x}$), mixed-phase oxides such as aluminum metal oxides (e.g., $AlCrO_x$ or $AlCoO_x$), cadmium sulfide (CdS), combinations thereof, and the like.

When the pigment flakes include a plurality of dielectric layers, the dielectric layers may be formed of the same or different dielectric materials and may have the same or different physical thicknesses. Typically, the one or more dielectric layers each have a physical thickness of about 30 nm to about 1000 nm. Generally, the physical thickness is selected to correspond with an optical thickness required by a particular optical design.

The pigment flakes may have a variety of optical designs. The optical designs of exemplary embodiments will be described in further detail hereafter. A particular optical design may be centered at different design wavelengths in the visible spectrum, e.g., by varying layer thicknesses or compositions, to provide different background colors. A particular background color corresponds to a wavelength band in the visible spectrum, referred to as a color band, characterized by or, preferably, centered at a particular design wavelength. Typically, a chromatic diffractive pigment composition has a reflectance of at least 50% at the design wavelength corresponding to the background color.

In some embodiments, the background color is provided through thin-film interference. When white light is incident on such embodiments, the background-color band of the white light is reflected by the one or more dielectric layers and another color band is transmitted, so that the pigment flake appears to have the background color. Such embodiments may, in some instances, provide a color-shifting effect, such that the pigment flake appears to have a first background color at a first viewing angle or incidence angle and a second background color at a second viewing angle or incidence angle.

In other embodiments, the background color is provided through selective absorption. In such embodiments, the one or more dielectric layers include at least one layer of an absorbing dielectric material. When white light is incident on such embodiments, a particular color band of the white light is selectively absorbed by the one or more dielectric layers, and the background-color band is reflected, so that the pigment flake appears to have the background color. In yet other embodiments, the background color is provided through a combination of thin-film interference and selective absorption.

It should be noted that, as the pigment flakes are all-dielectric and, generally, substantially transparent, the final visual appearance of an object coated with the diffractive pigment composition will be influenced by both the underlying color of the object and the background color provided by the pigment flakes.

The pigment flakes may have a variety of layer structures. The layer structures of exemplary embodiments will be described in further detail hereafter. For example, the pigment flakes may have a multilayer structure, which may be asymmetric or symmetric, or an encapsulated structure.

The pigment flakes also include a diffractive structure for providing a diffractive effect. To a first approximation, the background-color band is diffracted into its color components, i.e., angularly dispersed according to wavelength, by the diffractive structure, so that the pigment flake appears to have different component colors at different viewing angles. In other words, the thin-film interference provided by the dielectric layers "filters" the diffractive effect provided by the diffractive structure. It should be noted that the diffractive effect is most apparent under direct illumination. Under diffuse illumination, mainly the background color is observed.

At least one of the one or more dielectric layers has the diffractive structure formed therein or thereon. Typically, the diffractive structure is a diffraction grating, with ruled lines or holographically generated lines. Preferably, the diffraction grating has a line profile, e.g., a blazed, square, or sinusoidal profile, that increases the diffraction efficiency of one or more higher diffraction orders, while decreasing the diffraction efficiency of the zero diffraction order. Typically, the diffractive structure has a line frequency of about 500 lines/mm to about 4000 lines/mm, preferably, of about 1200 lines/mm to about 3500 lines/mm. Increasing the line frequency increases the angular dispersion, i.e., the "width", at each diffraction order, in accordance with the grating equation.

Examples of all-dielectric diffractive pigment flakes, as well as methods of fabricating such pigment flakes, are disclosed in U.S. Pat. No. 6,815,065. Examples of chromatic all-dielectric pigment flakes, as well as methods of fabricating such pigment flakes, are disclosed in U.S. Pat. No. 7,238,424, in U.S. Pat. No. 6,524,381, in U.S. Pat. No. 5,569,535, and in U.S. Pat. No. 5,059,245. The all-dielectric diffractive pigment flakes used to form the diffractive pigment blends and compositions of the present invention may be one of the disclosed embodiments, an adaptation or combination thereof, or a new embodiment. Moreover, the pigment flakes may be produced by one of the disclosed fabrication methods, by an adaptation or combination thereof, or by a new fabrication method. The fabrication methods used to produce exemplary embodiments of the present invention will be described in further detail hereafter.

In general, a substrate, such as a sheet of foil or plastic, patterned with a diffractive structure is provided. Some or all of the one or more dielectric layers are then sequentially deposited on the patterned substrate by using a deposition technique, such as physical vapor deposition (PVD), chemical vapor deposition (CVD), or electrolytic deposition, to form a single-layer or multilayer coating. Thereby, at least one of the one or more dielectric layers is patterned with the diffractive structure. The single-layer or multilayer coating is subsequently stripped from the substrate and ground or milled to form all-dielectric diffractive pigment flakes or preflakes. If preflakes are formed, the remaining one or more dielectric layers are then sequentially deposited on the preflakes to form all-dielectric diffractive pigment flakes.

The diffractive pigment blends and compositions of the present invention include a plurality of groups of all-dielectric diffractive pigment flakes. Typically, the blends and compositions include two to four groups. Each group consists of only one type of pigment flake, different from that of the other groups. Generally, all the types of pigment flake have the same optical design, centered at substantially the same design wavelength or at different design wavelengths. Also generally, all the types of pigment flake have the same layer structure, e.g., the same multilayer or encapsulated structure. Each group may provide substantially the same background color or a different background color. Furthermore, each group provides a different diffractive effect. In some instances, the groups are formed together in a single batch. In other instances, the groups are formed separately in different batches and then mixed.

In some embodiments, each group of all-dielectric diffractive pigment flakes provides a different background color and has a substantially same line frequency. That is, the pigment flakes of each group have an optical design centered at a different design wavelength in the visible spectrum, but include a diffractive structure having substantially the same line frequency. Thus, each group provides a diffractive effect having a different spectral profile but substantially the same angular dispersion at each diffraction order. In such embodiments, the diffractive pigment blend or composition provides a combined background color that is a combination of the different background colors provided by the groups, as well as a combined diffractive effect that is a combination of the different diffractive effects provided by the groups. Typically, the combined background color and the combined diffractive effect are additive combinations.

In a color-neutral or achromatic embodiment, the different background colors are selected, according to additive color theory, such that the diffractive pigment blend or composition provides a white, i.e., color-neutral, background color and a white diffractive effect. The neutral white background color substantially preserves the underlying color of an object coated with the diffractive pigment blend or composition, and the neutral white diffractive effect exhibits essentially all colors of the rainbow at different viewing angles over the underlying color. Any suitable combination of background colors may be selected. Suitable combinations of background colors include three primary colors, three secondary colors, and two complementary colors. For example, a color-neutral diffractive pigment blend or composition may be formed by using red, green, and blue all-dielectric diffractive pigment flakes, or magenta, yellow, and cyan all-dielectric diffractive pigment flakes.

In other embodiments, each group of all-dielectric diffractive pigment flakes provides substantially the same background color and has a different line frequency. That is, the pigment flakes of each group have an optical design centered at substantially the same design wavelength in the visible spectrum, but include a diffractive structure having a different line frequency. Thus, each group provides diffractive effects having substantially the same spectral profile but a different angular dispersion at each diffraction order. In such embodiments, the diffractive pigment blend or composition provides a background color that is substantially the same as the background color provided by the groups, as well as a combined diffractive effect that is a combination of the different diffractive effects provided by the groups. For example, the combined diffractive effect may include a reversal in color travel. Typically, the combined diffractive effect is an additive combination.

In yet other embodiments, each group of all-dielectric diffractive pigment flakes provides a different background color and has a different line frequency. In such embodiments, the diffractive pigment blend or composition provides a combined background color that is a combination of the different background colors provided by the groups, as well as a combined diffractive effect that is a combination of the different diffractive effects provided by the groups. Typically, the combined background color and the combined diffractive effect are additive combinations.

The groups of all-dielectric diffractive pigment flakes may be mixed, in the absence of a pigment medium, to form a diffractive pigment blend. Alternatively, the groups may be blended and dispersed in a pigment medium to form a diffractive pigment composition. The pigment medium may be any suitable type of pigment medium. Typically, the pigment medium includes a binder or resin that can be cured, for example, by evaporation, by heating, or by exposure to ultraviolet (UV) radiation. Non-limiting examples of suitable resins include alkyd resins, polyester resins, acrylic resins, polyurethane resins, vinyl resins, epoxy resins, styrene resins, and melamine resins. Optionally, the pigment medium may include a carrier or solvent such as an organic solvent or water, a cure retarder such as clove oil, or other additives.

The diffractive pigment composition may be used as a paint or an ink and applied to various objects, such as currency and security documents, product packagings, fabrics, motorized vehicles, sporting goods, electronic housings, household appliances, architectural structures, and floorings.

Embodiments Having a Multilayer Structure

In some embodiments, the all-dielectric diffractive pigment flakes have a multilayer structure, which may be asymmetric or symmetric. In other words, the pigment flakes consist of multilayer stacks, i.e., dichroic stacks. The multilayer stacks each include a plurality of dielectric layers, typically, 3 to 9 dielectric layers. More specifically, the multilayer stacks each include alternating layers of high-index dielectric material (H) and low-index dielectric material (L), i.e., one or more HL pairs and an optional additional H or L layer.

In an exemplary embodiment, the H layers are composed of the same high-index dielectric material, and have substantially the same physical and optical thickness. Likewise, the L layers are composed of the same low-index dielectric material, and have substantially the same physical and optical thickness. Both the H layers and the L layers have a quarter-wave optical thickness (QWOT) at a design wavelength. Accordingly, as a result of thin-film interference, the multilayer stacks provide a background color characterized by or, preferably, centered at the design wavelength. In general, light of wavelengths other than the design wavelength tends to interfere destructively when reflected at an interface between an H layer and an L layer, whereas light of the design wavelength interferes constructively when reflected, providing the background color. By adjusting the QWOT, different background colors can be achieved. Furthermore, by adjusting the number of HL pairs, the width and intensity of the background-color band can be adjusted. With a larger number of HL pairs, a narrower and more intense background-color band can be achieved.

Figure 1:
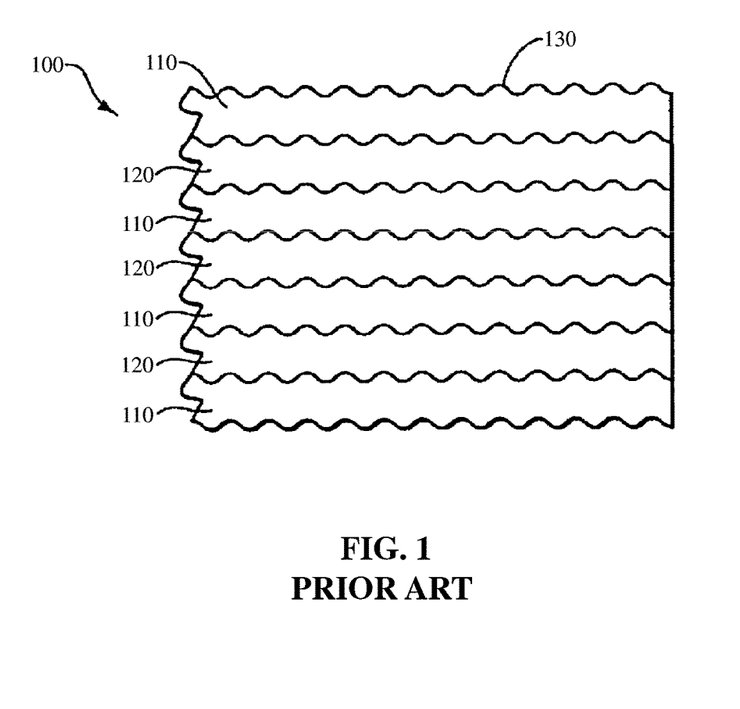
FIG. 1 is a schematic illustration of a cross-section of an all-dielectric diffractive pigment flake having a multilayer structure.

With reference to FIG. 1, an exemplary all-dielectric diffractive pigment flake 100 having a symmetric multilayer structure consists of a seven-layer stack. The seven-layer stack includes four H layers 110 alternating with three L layers 120. The four H layers 110 are composed of $TiO_2$, and the three L layers 120 are composed of $SiO_2$. The H layers 110 and the L layers 120 all have a QWOT at a design wavelength. Furthermore, the H layers 110 and the L layers 120 all include a diffraction grating 130.

Example 1

In a color-neutral or achromatic embodiment, the combined diffractive pigment composition of Example 1 includes four groups of all-dielectric diffractive pigment flakes 100 as illustrated in FIG. 1. The four groups are each centered at a different design wavelength, namely 400 nm, 500 nm, 600 nm, or 700 nm. In each of the four groups, the diffraction grating 130 has substantially the same line frequency, namely 1440 lines/mm.

To aid in understanding, diffractive pigment compositions are compared with their non-diffractive analogues in the following. Groups of diffractive and non-diffractive all-dielectric pigment flakes centered at each of the four different design wavelengths were fabricated together. A sheet of foil embossed with the diffraction grating, as well as square frames for facilitating breakage into square flakes of 25 μm×25 μm, was provided as a substrate for the diffractive all-dielectric pigment flakes. A flat sheet of foil was provided as a substrate for the non-diffractive all-dielectric pigment flakes. The seven dielectric layers were then sequentially deposited on the substrates by vacuum evaporation in a box coater. The seven-layer coatings were stripped from the substrates, and ultrasonically agitated to yield diffractive and non-diffractive all-dielectric pigment flakes of an average particle size of about 25 μm. The groups were also fabricated separately in a similar manner.

Each group of diffractive or non-diffractive all-dielectric pigment flakes, centered at a particular design wavelength, was dispersed in a paint vehicle. Thereby, separate diffractive and non-diffractive pigment compositions centered at 400 nm, 500 nm, 600 nm, and 700 nm were formed. The four groups of diffractive all-dielectric pigment flakes were blended at a 1:1:1:1 ratio by weight, i.e., at a weight fraction of 25% each, to form a diffractive pigment blend, and dispersed in the paint vehicle at a ratio by weight of 0.2 pigment flakes:3.9 paint vehicle to form a combined diffractive pigment composition. Likewise, the four groups of non-diffractive all-dielectric pigment flakes were blended at a 1:1:1:1 ratio by weight, i.e., at a weight fraction of 25% each, to form a non-diffractive pigment blend, and dispersed in the paint vehicle at a ratio by weight of 0.2 pigment flakes:3.9 paint vehicle to form a combined non-diffractive pigment composition.

With reference to FIG. 2, drawdowns 210, 211, 212, and 213 of the four separate diffractive pigment compositions centered at 400 nm, 500 nm, 600 nm, and 700 nm, respectively, and a drawdown 214 of the combined diffractive pigment composition were painted onto black-and-white Laneta cards. Likewise, drawdowns 220, 221, 222, and 223 of the four non-diffractive pigment compositions centered at 400 nm, 500 nm, 600 nm, and 700 nm, respectively, and a drawdown 224 of the combined non-diffractive pigment composition were painted onto black-and-white Laneta cards.

Figure 2A:
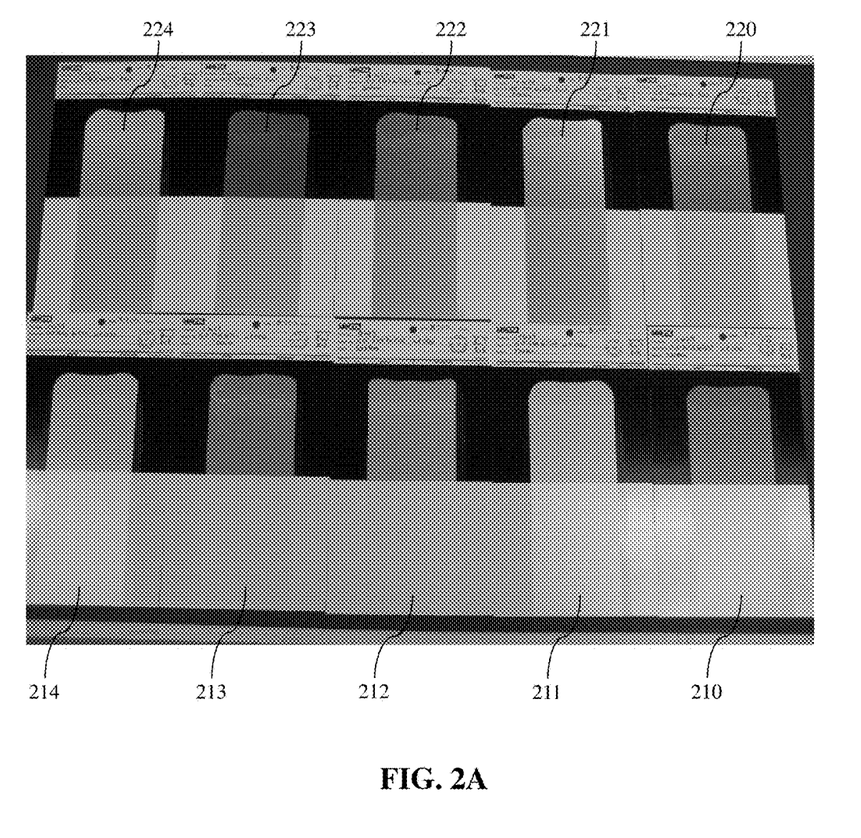
FIG. 2A is a photograph of paint drawdowns of the diffractive and non-diffractive pigment compositions of Example 1 under diffuse illumination.

FIG. 2A is a photograph of the paint drawdowns 210-214 and 220-224 under diffuse illumination. In general, the non-diffractive pigment compositions are more chromatic and have a more metallic appearance. With increasing wavelength, the colors of the drawdowns 220-223 of the four separate non-diffractive pigment compositions go from blue at 400 nm, to green at 500 nm, to orange at 600 nm, to red at 700 nm over black. The complementary colors are observed over white. With increasing wavelength, the colors of the drawdowns 220-223 go from yellow at 400 nm, to purple at 500 nm, to blue at 600 nm, to cyan at 700 nm over white. Although not as chromatic, the same general color trends are observed for the drawdowns 210-213 of the four separate diffractive pigment compositions. The drawdown 214 of the combined diffractive pigment composition and the drawdown 224 of the combined non-diffractive pigment composition are essentially color-neutral, i.e., achromatic. The combined diffractive and non-diffractive pigment compositions appear silver over black and white over white.

Figure 3:
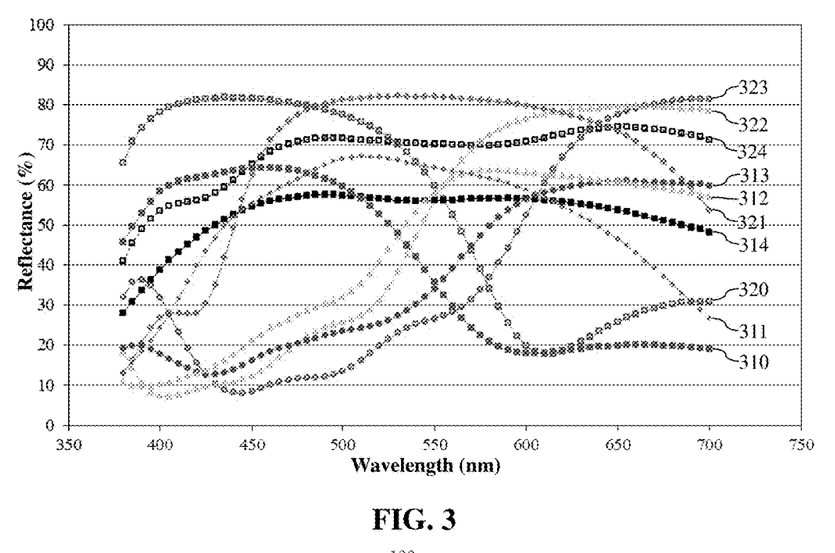
FIG. 3 is a plot of reflectance spectra of the diffractive and non-diffractive pigment compositions of Example 1.

The reflectance of the paint drawdowns 210-214 and 220-224 over black under diffuse illumination was characterized with a DataColor SF600+ spectrophotometer, which uses an integrating sphere to yield a diffuse/8° illumination/viewing geometry with specular included. With reference to FIG. 3, reflectance spectra 310, 311, 312, 313, and 314 were obtained for the four separate diffractive pigment compositions centered at 400 nm, 500 nm, 600 nm, and 700 nm, and for the combined diffractive pigment composition, respectively. Likewise, reflectance spectra 320, 321, 322, 323, and 324 were obtained for the four non-diffractive pigment compositions centered at 400 nm, 500 nm, 600 nm, and 700 nm, and for the combined non-diffractive pigment composition, respectively. In general, the diffractive and non-diffractive pigment compositions centered at different design wavelengths have a higher reflectance at wavelengths closer to the design wavelengths. Thus, the observed colors of the separate diffractive and non-diffractive pigment compositions are mainly the background colors corresponding to the design wavelengths under diffuse illumination.

In particular, the reflectance spectra 314 and 324 of the combined diffractive and non-diffractive pigment compositions, respectively, are relatively flat over the visible wavelength range, i.e., over 400 nm to 700 nm, demonstrating color-neutrality under diffuse illumination. The combined diffractive and non-diffractive pigment compositions each have a reflectance of at least 30% over the entire visible wavelength range. The observed "white" colors of the combined diffractive and non-diffractive pigment compositions are essentially a combination of the different background colors of the separate diffractive and non-diffractive pigment compositions, according to additive color theory.

Figure 2B:
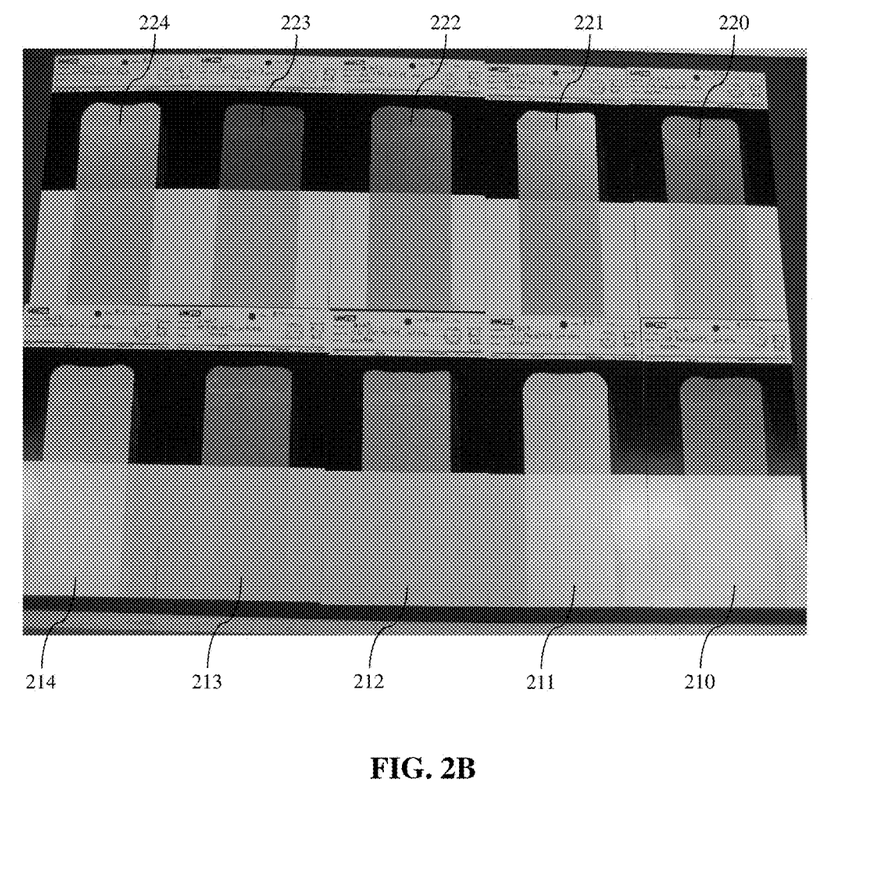
FIG. 2B is a photograph of the drawdowns of FIG. 2A under direct illumination at a first incidence angle.
Figure 2C:
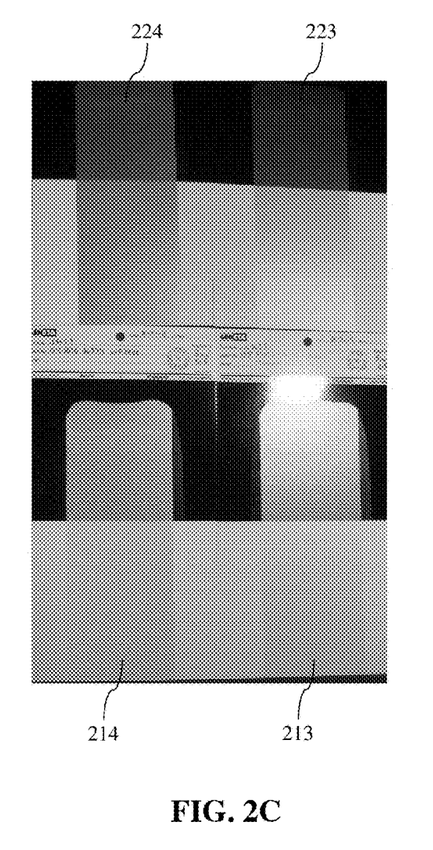
FIG. 2C is a photograph of the drawdowns of FIG. 2A under direct illumination at a second incidence angle.
Figure 2D:
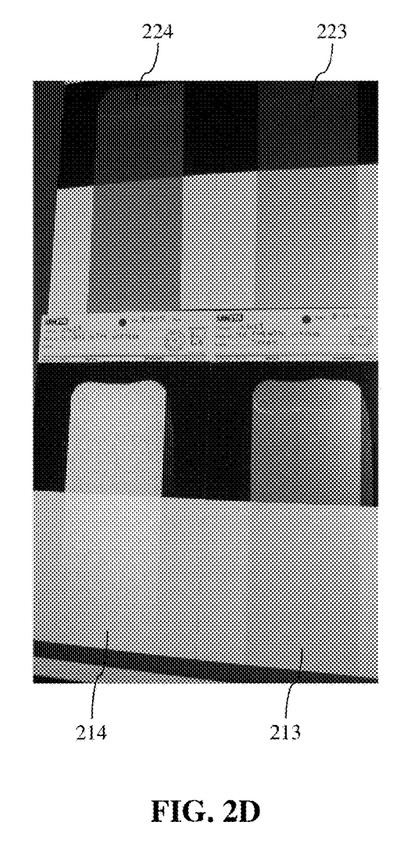
FIG. 2D is a photograph of the drawdowns of FIG. 2A under direct illumination at a third incidence angle.

FIG. 2B is a photograph of the drawdowns 210-214 and 220-224 under direct illumination at a first incidence angle; FIGS. 2C and 2D are photographs of the drawdowns 213, 214, 223, and 224 under direct illumination at second and third left oblique incidence angles, respectively. Under direct illumination, the diffractive and non-diffractive pigment compositions differ more strongly in appearance. In general, the non-diffractive pigment compositions are darker, whereas the diffractive pigment compositions are brighter, reflecting considerably more light. In particular, the diffractive pigment compositions act as retroreflectors, sending diffracted light, i.e., non-zero diffraction orders, back to the illuminating source. In contrast, the non-diffractive pigment compositions only reflect light specularly.

The color travel of the paint drawdowns 210-214 over black, under direct illumination at an incidence angle of 45° and viewing angles of −33° to 80° with a step of 1°, was characterized with a Murakami goniospectrophotometer. With respect to FIG. 4, color trajectories 410, 411, 412, 413, and 414 were obtained for the four separate diffractive pigment compositions centered at 400 nm, 500 nm, 600 nm, and 700 nm, and for the combined diffractive pigment composition, respectively.

Figure 4:
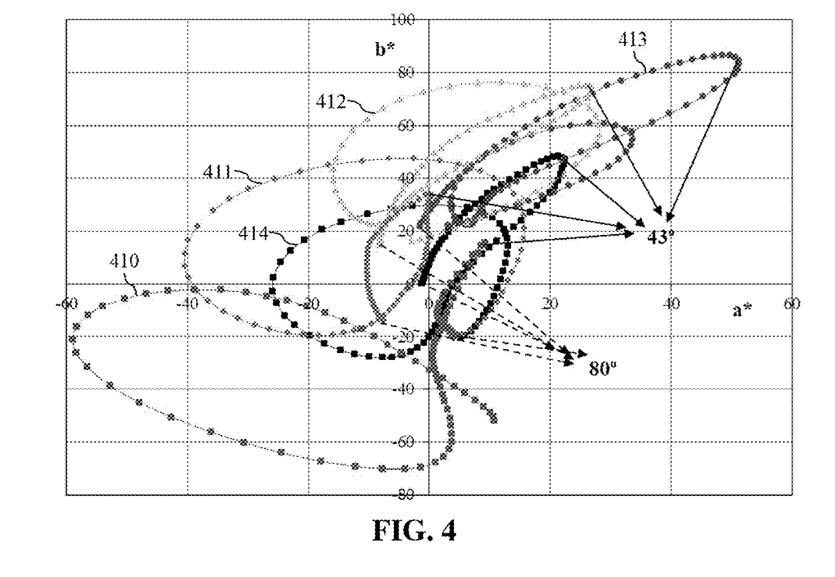
FIG. 4 is a plot of color trajectories of the diffractive pigment compositions of Example 1.

The color trajectory 413 of the diffractive pigment composition centered at 700 nm is limited to the first quadrant, i.e., positive a* and b*, indicating that only wavelengths between yellow, i.e., about 580 nm, and red, i.e., about 700 nm, are diffracted. At this design wavelength, only wavelengths near 700 nm will interfere constructively when reflected from the seven-layer stack. To a first approximation, the thin-film interference provided by the seven-layer stack filters the diffractive effect provided by the diffraction grating. In other words, the seven-layer stack acts as an interference filter placed in front of a "white" diffractive effect, i.e., all colors of the rainbow, so that a "colored" diffractive effect, i.e., a filtered rainbow, is observed.

Similarly, the color trajectory 412 of the diffractive pigment composition centered at 600 nm is limited to the first and second quadrants, the color trajectory 411 of the diffractive pigment composition centered at 500 nm is mainly located in the second and third quadrants, and the color trajectory 410 of the diffractive pigment composition centered at 400 nm is mainly located in the third quadrant.

On the other hand, the color trajectory 414 of the combined diffractive pigment composition is nearly equally distributed about the origin of the a*b* plot, indicating that all colors of the rainbow are observed. For a given incidence angle, a particular diffraction order passes through the visible spectrum with change in viewing angle. In other words, the combined diffractive pigment composition provides a white, i.e., color-neutral, diffractive effect.

Advantageously, the combined diffractive pigment composition is not only color-neutral under diffuse illumination, as shown in FIG. 3, but is also color-neutral under direct illumination, as shown in FIG. 4. Unexpectedly, not only is the background color provided by thin-film interference additive, but the color provided by diffractive interference is also additive. In other words, the combined diffractive effect of the combined diffractive pigment composition is an additive combination of the different diffractive effects provided by the separate diffractive pigment compositions.

Examples 2 and 3

In two color-reversal embodiments, the combined diffractive pigment compositions of Examples 2 and 3 each include two groups of all-dielectric diffractive pigment flakes 100 as illustrated in FIG. 1. The two groups are centered at substantially the same design wavelength, namely 550 nm (Example 2) or 700 nm (Example 3). In each of the two groups, the diffraction grating 130 has a different line frequency, namely 1440 lines/mm or 2000 lines/mm.

Groups of all-dielectric diffractive pigment flakes centered at 550 nm (Example 2) or 700 nm (Example 3) having the two different line frequencies were fabricated together. Two sheets of foil embossed with the diffraction gratings having the two line frequencies, as well as square frames for facilitating breakage into square flakes of 25 μm×25 μm, were provided as substrates for the all-dielectric diffractive pigment flakes. The seven dielectric layers were then sequentially deposited on the substrates by vacuum evaporation in a box coater. The seven-layer coatings were stripped from the substrates, and ultrasonically agitated to yield all-dielectric diffractive pigment flakes, having the two line frequencies, of an average particle size of about 25 μm. The groups were also fabricated separately in a similar manner.

Each group of all-dielectric diffractive pigment flakes, having a particular line frequency, was dispersed in a paint vehicle. Thereby, separate diffractive pigment compositions centered at 550 nm (Example 2) or 700 nm (Example 3), having line frequencies of 1440 lines/mm and 2000/mm, were formed. The two groups of all-dielectric diffractive pigment flakes centered at 550 nm were blended at a 1:1 ratio by weight, i.e., at a weight fraction of 50% each, to form a diffractive pigment blend centered at 550 nm, and dispersed in the paint vehicle at a ratio by weight of 0.14 pigment flakes:3.9 paint vehicle to form a combined diffractive pigment composition centered at 550 nm. Likewise, the two groups of all-dielectric diffractive pigment flakes centered at 700 nm were blended at a 1:1 ratio by weight, i.e., at a weight fraction of 50% each, to form a diffractive pigment blend centered at 700 nm, and dispersed in the paint vehicle at a ratio by weight of 0.14 pigment flakes:3.9 paint vehicle to form a combined diffractive pigment composition centered at 700 nm.

Drawdowns of the two separate diffractive pigment compositions centered at 550 nm, having line frequencies of 1440 lines/mm and 2000 lines/mm, and a drawdown of the combined diffractive pigment composition centered at 550 nm were painted onto black-and-white Laneta cards (Example 2). Likewise, drawdowns of the two separate diffractive pigment compositions centered at 700 nm, having line frequencies of 1440 lines/mm and 2000 lines/mm, and a drawdown of the combined diffractive pigment composition centered at 700 nm were painted onto black-and-white Laneta cards (Example 3).

Figure 5:
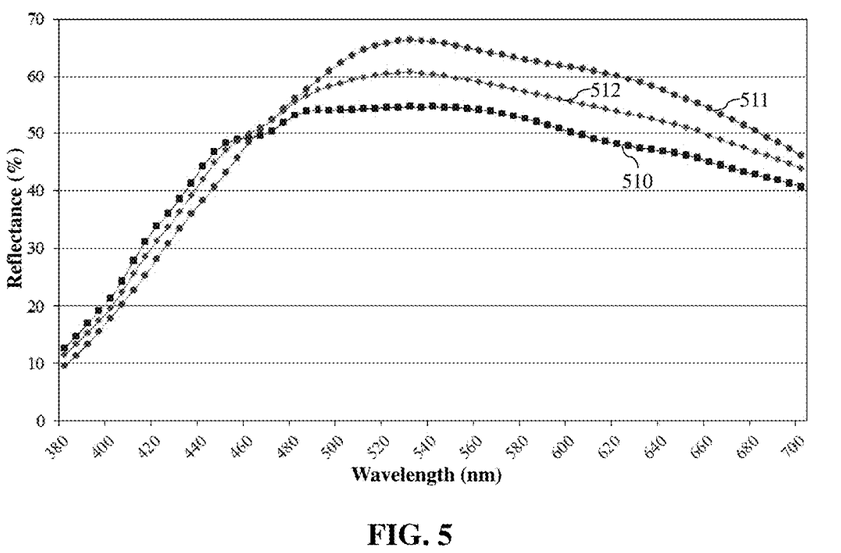
FIG. 5 is a plot of reflectance spectra of the diffractive pigment compositions of Example 2.

The reflectance of the paint drawdowns over black under diffuse illumination was characterized with the DataColor SF600+ spectrophotometer. With reference to FIG. 5, reflectance spectra 510, 511, and 512 were obtained for the two separate diffractive pigment compositions centered at 550 nm, having line frequencies of 1440 lines/mm and 2000 lines/mm, and for the combined diffractive pigment composition centered at 550 nm, respectively (Example 2). The pigment compositions have a maximum reflectance at wavelengths of 530 nm to 550 nm, corresponding to a green background color. Thus, the observed colors of the separate and combined diffractive pigment compositions are mainly the background color corresponding to the design wavelength under diffuse illumination. Moreover, the reflectance spectrum 512 of the combined diffractive pigment composition is essentially an average of the reflectance spectra 510 and 511 of the separate diffractive pigment compositions.

The color travel of the paint drawdowns over black under direct illumination was characterized with the Murakami goniospectrophotometer. With respect to FIG. 6A, color trajectories 610, 611, and 612 were obtained at an incidence angle of 0° and viewing angles of 12° to 80° with a step of 1°, for the two separate diffractive pigment compositions centered at 550 nm, having line frequencies of 1440 lines/mm and 2000 lines/mm, and for the combined diffractive pigment composition centered at 550 nm, respectively (Example 2).

Figure 6A:
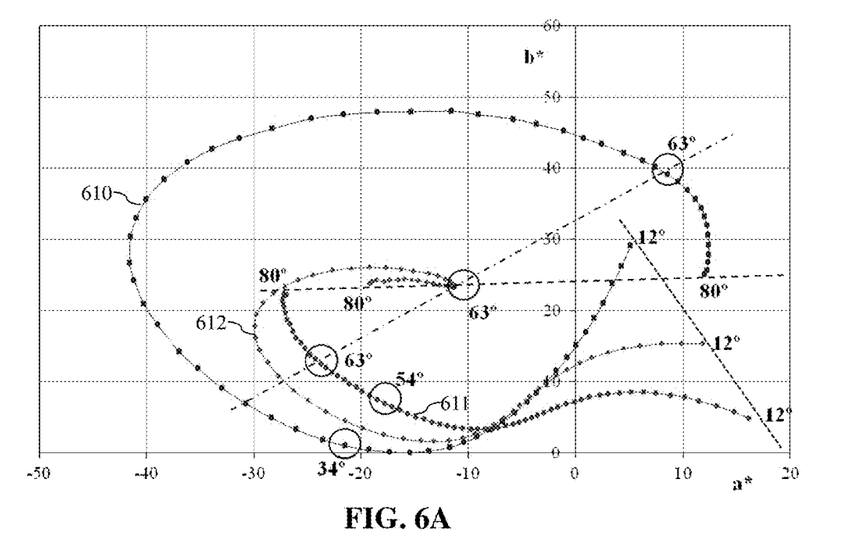
FIG. 6A is a plot of color trajectories of the diffractive pigment compositions of Example 2 at a first set of illumination and viewing conditions.

The color trajectories 610, 611, and 612 of the two separate diffractive pigment compositions and the combined diffractive pigment composition centered at 550 nm, respectively, are mainly located in the second quadrant, indicating that mainly wavelengths between yellow, i.e., about 580 nm, and green, i.e., about 510 nm, are diffracted.

In particular, the color trajectory 610 of the diffractive pigment composition having a line frequency of 1440 lines/mm goes from yellow to green from 12° to 34°, where only specular reflection, i.e., the zero diffraction order, is expected. At higher angles, where the −1 diffraction order is expected, the color trajectory 610 is located in the second quadrant, corresponding to yellow-green tints, from 34° to about 60° and is located in the first quadrant, corresponding to yellow-red tints, from about 60° to 80°. To a first approximation, the thin-film interference provided by the seven-layer stack filters the diffractive effect provided by the diffraction grating.

The color trajectory 611 of the diffractive pigment composition having a line frequency of 2000 lines/mm behaves similarly, but passes through a smaller range of colors. This behavior is consistent with that predicted by the grating equation. At an incidence angle of 0°, wavelengths of 400 nm to 500 nm are predicted to be diffracted in the −1 diffraction order at angles of 53° to 90° by the diffraction grating having a line frequency of 2000 lines/mm. In contrast, at an incidence angle of 0°, wavelengths of 400 nm to 694 nm are predicted to be diffracted in the −1 diffraction order at angles of 35° to 90° by the diffraction grating having a line frequency of 1440 lines/mm.

The color trajectory 612 of the combined diffractive pigment composition is located between the color trajectories 610 and 611 of the separate diffractive pigment compositions for all viewing angles, e.g., 63°, demonstrating that the color provided by diffractive interference is additive, i.e., follows additive color theory. In other words, the combined diffractive effect provided by the combined diffractive pigment composition is an additive combination of the different diffractive effects provided by the separate diffractive pigment compositions.

Notably, the color trajectory 612 of the combined diffractive pigment composition moves steadily from 12° to 63°, where it abruptly changes direction and moves to a greener coloration from 63° to 80°. In other words, the combined diffractive pigment composition exhibits a reversal in color travel, which may produce interesting optical effects.

Figure 6B:
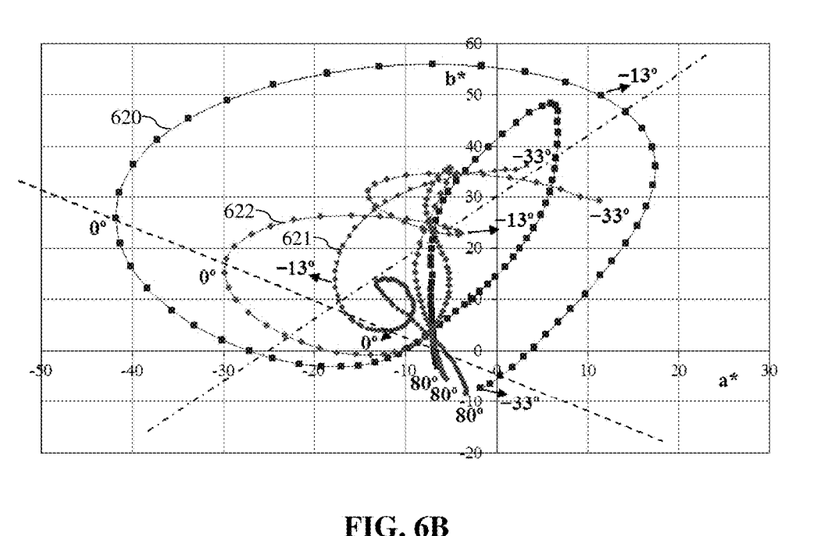
FIG. 6B is a plot of color trajectories of the diffractive pigment compositions of Example 2 at a second set of illumination and viewing conditions.

With respect to FIG. 6B, color trajectories 620, 621, and 622 were obtained at an incidence angle of 45° and viewing angles of −33° to 80° with a step of 1°, for the two separate diffractive pigment compositions centered at 550 nm, having line frequencies of 1440 lines/mm and 2000 lines/mm, and for the combined diffractive pigment composition centered at 550 nm, respectively (Example 2).

Again at this set of illumination and viewing conditions, the color trajectory 622 of the combined diffractive pigment composition is located between the color trajectories 620 and 621 of the separate diffractive pigment compositions for all viewing angles, e.g., 0° and −13°, demonstrating that the color provided by diffractive interference is additive. Notably, the color trajectory 622 of the combined diffractive pigment composition includes a loop. The color trajectory 622 moves in one direction from about 5° to −13°, where it abruptly changes direction, and then moves in the opposite direction from −13° to about −20°. In other words, the combined diffractive pigment composition exhibits a reversal in color travel, which may produce interesting optical effects.

Figure 7:
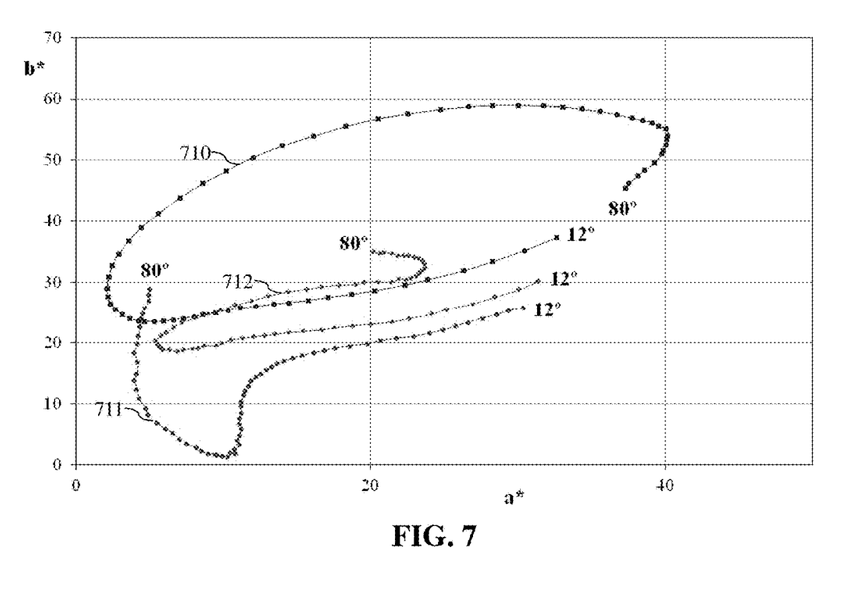
FIG. 7 is a plot of color trajectories of the diffractive pigment compositions of Example 3.

With respect to FIG. 7, color trajectories 710, 711, and 712 were obtained at an incidence angle of 0° and viewing angles of 12° to 80° with a step of 1°, for the two separate diffractive pigment compositions centered at 700 nm, having line frequencies of 1440 lines/mm and 2000 lines/mm, and for the combined diffractive pigment composition centered at 700 nm, respectively (Example 3).

The color trajectories 710, 711, and 712 of the two separate diffractive pigment compositions and the combined diffractive pigment composition centered at 700 nm, respectively, are limited to the first quadrant, indicating that only wavelengths between yellow, i.e., about 580 nm, and red, i.e., about 700 nm, are diffracted. To a first approximation, the thin-film interference provided by the seven-layer stack filters the diffractive effect provided by the diffraction grating. As for the combined diffractive pigment composition centered at 550 nm, the color trajectory 712 of the combined diffractive pigment composition centered at 700 nm is located between the color trajectories 710 and 711 of the separate diffractive pigment compositions centered at 700 nm for all viewing angles, demonstrating that the color provided by diffractive interference is additive.

Embodiments Having an Encapsulated Structure

In some embodiments, the all-dielectric diffractive pigment flakes have an encapsulated structure. In other words, the pigment flakes consist of encapsulated preflakes. The encapsulated preflakes each include a plurality of dielectric layers, typically, 2 to 5 dielectric layers. More specifically, the encapsulated preflakes each include alternating layers of high-index dielectric material (H) and low-index dielectric material (L), i.e., one or more HL pairs and an optional additional H or L layer. The alternating layers include a core layer or preflake, which may be an H or L layer, and one or more encapsulating layers. At least the core layer includes a diffraction grating.

In a first exemplary embodiment, the H layers are composed of the same high-index dielectric material, and have substantially the same physical and optical thickness. Likewise, the L layers are composed of the same low-index dielectric material, and have substantially the same physical and optical thickness. Both the H layers and the L layers have a quarter-wave optical thickness (QWOT) at a design wavelength. Accordingly, as a result of thin-film interference, the encapsulated preflakes provide a background color characterized by, preferably, centered at the design wavelength. By adjusting the QWOT, different background colors can be achieved. In order to manufacture a color-neutral diffractive pigment composition or a blended-color diffractive pigment composition according to this embodiment, it is necessary to blend separate groups of encapsulated preflakes centered at different design wavelengths.

In a second exemplary embodiment, the H layers are, generally, but not necessarily, composed of the same high-index dielectric material, and the L layers are, generally, but not necessarily, composed of the same low-index dielectric material. The core layer has a physical thickness selected for a particular a design wavelength, and the encapsulating layers have physical thicknesses that are substantially the same for all design wavelengths. Accordingly, as a result of thin-film interference, the encapsulated preflake provides a background color characterized by or, preferably, centered at the design wavelength. By adjusting the physical thickness of the core layer, different background colors can be achieved. Changing the optical path through the core layer creates a different thin film interference condition.

Advantageously, such an embodiment is particularly convenient for the manufacture of color-neutral diffractive pigment compositions and of blended-color diffractive pigment compositions. Instead of separately manufacturing groups of all-dielectric diffractive pigment flakes centered at different design wavelengths in different batches and subsequently blending the groups to provide a diffractive pigment blend, groups of all-dielectric diffractive pigment flakes having different colorations may be manufactured together in a single batch, starting from core layers or preflakes having different physical thicknesses, to provide a diffractive pigment blend. In other words, the groups of all-dielectric diffractive pigment flakes are automatically blended.

Figure 8:
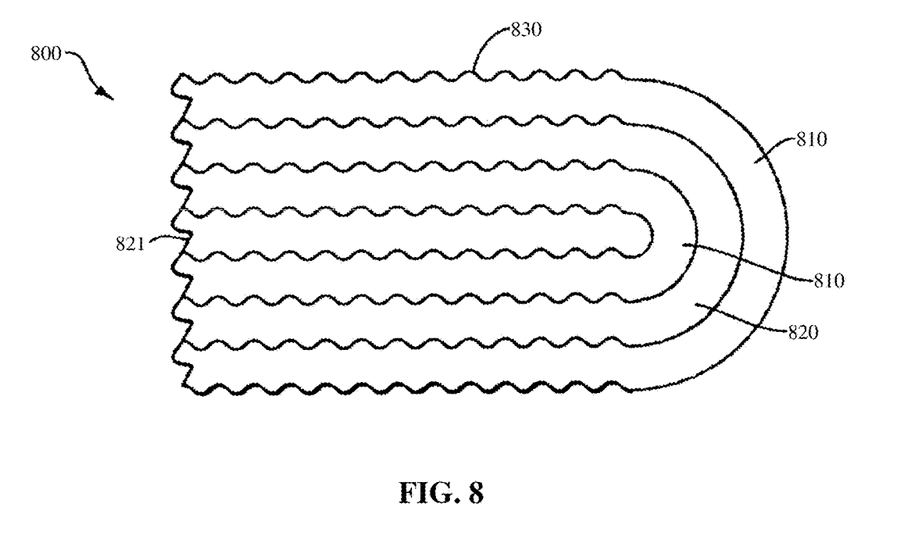
FIG. 8 is a schematic illustration of a cross-section of an all-dielectric diffractive pigment flake having an encapsulated structure.

With reference to FIG. 8, an exemplary all-dielectric diffractive pigment flake 800 having an encapsulated structure consists of a preflake or core layer 821 encapsulated by three layers 810 and 820. More specifically, the pigment flake 800 includes a core L layer 821 surrounded by an encapsulating H layer 810, which is surrounded by an encapsulating L layer 820, which is surrounded by another encapsulating H layer 810. The two H layers 810, which are composed of $TiO_2$, alternate with the two L layers 820 and 821, which are composed of $SiO_2$. The core L layer 821 has a physical thickness selected for a particular design wavelength, and the encapsulating H layers 810 and L layer 820 have physical thicknesses substantially fixed for all design wavelengths. Furthermore, the H layers 810 and the L layers 820 and 821 all include a diffraction grating 830.

An exemplary color-neutral diffractive pigment composition includes groups of all-dielectric diffractive pigment flakes 800 as illustrated FIG. 8. Each group has a different physical thickness of the core L layer 821, e.g., between about 50 nm and about 300 nm, and substantially the same physical thicknesses of the encapsulating H layers 810, e.g., about 60 nm, and L layer 820, e.g., about 90 nm. Thus, the groups have colorations varying from red, to yellow, to green, to blue, to violet. In each of the groups, the diffraction grating 830 has substantially the same line frequency, e.g., 1440 lines/mm. Accordingly, the diffractive pigment composition provides a white, i.e., color-neutral, background color, as well as a white diffractive effect, as described heretofore with respect to Example 1.

In an alternative embodiment, each group of all-dielectric diffractive pigment flakes 800 has a different line frequency, e.g., 1440 lines/mm and 2000 lines/mm, in addition to a different physical thickness of the core L layer 821, such that the diffractive pigment composition provides a neutral white background color and a combined diffractive effect.

The exemplary color-neutral diffractive pigment composition may be manufactured in a similar manner to that of Example 1 by sequentially depositing encapsulating dielectric layers onto groups of all-dielectric diffractive preflakes having different physical thicknesses. The encapsulating layers may be deposited, under fixed deposition conditions to achieve substantially the same physical thicknesses for all the groups, by using various deposition techniques. Suitable deposition techniques include fluidized-bed thermal or plasma-assisted CVD, PVD onto a curtain of particles falling between sputter targets or onto particles moving on vibrating conveyers, CVD or PVD onto particles tumbling in a cylinder, remote-plasma CVD, and wet-chemistry deposition.

Of course, numerous other embodiments may be envisaged without departing from the spirit and scope of the invention.

We claim:

1. A diffractive pigment composition comprising:
   a pigment medium; and
   a plurality of different types of all-dielectric diffractive pigment flakes blended and dispersed in the pigment medium,
      wherein each type of all-dielectric diffractive pigment flake includes one or more dielectric layers for providing a background color;
      wherein at least one of the one or more dielectric layers includes a diffractive structure for providing a diffractive optical effect;
      wherein each type of all-dielectric diffractive pigment flake, of the plurality of different types of all-dielectric diffractive pigment flakes, provides a different diffractive optical effect than other types of all-dielectric diffractive pigment flakes of the plurality of different types of all-dielectric diffractive pigment flakes;
      wherein the diffractive pigment composition provides a combined diffractive optical effect that is a combination of the different diffractive optical effects provided by the plurality of different types of all-dielectric diffractive pigment flakes;
      wherein each type of all-dielectric diffractive pigment flake, of the plurality of different types of all-dielectric diffractive pigment flakes, has a different physical thickness of a core layer than other types of all-dielectric diffractive pigment flakes of the plurality of different types of all-dielectric diffractive pigment flakes and substantially same physical thicknesses of one or more encapsulating layers, such that each type of all-dielectric diffractive pigment flake provides a different background color than other types of all-dielectric diffractive pigment flakes of the plurality of different types of all-dielectric diffractive pigment flakes; and
      wherein the diffractive pigment composition provides a combined background color that is a combination of the different background colors provided by the plurality of different types of all-dielectric diffractive pigment flakes.

2. The diffractive pigment composition of claim 1, wherein each type of all-dielectric diffractive pigment flake, of the plurality of different types of all-dielectric diffractive pigment flakes, has a substantially same line frequency.

3. The diffractive pigment composition of claim 1,
   wherein the combined background color is a white background color, and
   wherein the combined diffractive optical effect is a white diffractive effect.

4. The diffractive pigment composition of claim 1, wherein the combined diffractive optical effect includes a reversal in color travel.

5. The diffractive pigment composition of claim 1, wherein each type of all-dielectric diffractive pigment flake, of the plurality of different types of all-dielectric diffractive pigment flakes, has a different line frequency than other types of all-dielectric diffractive pigment flakes of the plurality of different types of all-dielectric diffractive pigment flakes.

6. The diffractive pigment composition of claim 1, wherein the one or more dielectric layers are a plurality of dielectric layers.

7. The diffractive pigment composition of claim 6, wherein the plurality of dielectric layers include alternating layers of high-index dielectric material and low-index dielectric material.

8. The diffractive pigment composition of claim 7,
   wherein each of the alternating layers has a quarter-wave optical thickness corresponding to a design wavelength, and
   wherein the background color is centered at the design wavelength.

9. The diffractive pigment composition of claim 1, wherein each type of all-dielectric diffractive pigment flake, of the plurality of different types of all-dielectric diffractive pigment flakes, has a different quarter-wave optical thickness corresponding to a different design wavelength.

10. The diffractive pigment composition of claim 1,
    wherein the one or more dielectric layers include at least one layer of an absorbing dielectric material, and
    wherein the background color is at least partially provided through selective absorption.

11. The diffractive pigment composition of claim 10, wherein the absorbing dielectric material is an absorbing metal compound, a cermet, a dielectric material including radiation-induced color centers, or a combination thereof.

12. The diffractive pigment composition of claim 1, wherein the background color is provided through thin-film interference, selective absorption, or a combination thereof.

13. The diffractive pigment composition of claim 1, wherein each type of all-dielectric diffractive pigment flake, of the plurality of different types of all-dielectric diffractive pigment flakes, has a same layer structure.

14. A diffractive pigment blend comprising:
    a plurality of different types of all-dielectric diffractive pigment flakes,
       wherein each type of all-dielectric diffractive pigment flake, of the plurality of different types of all-dielectric diffractive pigment flakes, includes one or more dielectric layers and provides a different background color than other types of all-dielectric diffractive pigment flakes of the plurality of different types of all-dielectric diffractive pigment flakes;
       wherein at least one of the one or more dielectric layers includes a diffractive structure for providing a diffractive optical effect;
       wherein each type of all-dielectric diffractive pigment flake, of the plurality of different types of all-dielectric diffractive pigment flakes, provides a different diffractive optical effect;
       wherein the diffractive pigment blend provides a combined diffractive optical effect that is a combination of the different diffractive optical effects provided by the plurality of different types of all dielectric diffractive pigment flakes;

wherein each type of all-dielectric diffractive pigment flake, of the plurality of different types of all-dielectric diffractive pigment flakes, has a different physical thickness of a core layer than other types of all-dielectric diffractive pigment flakes of the plurality of different types of all-dielectric diffractive pigment flakes; and wherein the diffractive pigment blend provides a combined background color that is a combination of the different background colors provided by the plurality of different types of all-dielectric diffractive pigment flakes.

15. A diffractive pigment composition comprising:

a plurality of diffractive pigment flakes of a first type of diffractive pigment flakes, wherein a first flake of the first type of diffractive pigment flakes includes one or more first dielectric layers and a first diffractive structure and provides a first background color; and a plurality of diffractive pigment flakes of a second type of diffractive pigment flakes, wherein a second flake of the second type of diffractive pigment flakes includes one or more second dielectric layers and a second diffractive structure and provides a second background color, wherein either the one or more first dielectric layers of the first flake are made of a different material than the one or more second dielectric layers of the second flake or the one or more first dielectric layers of the first flake have a different physical thickness than the one or more dielectric second layers of the second flake, and wherein the diffractive pigment composition provides a combined background color that is a combination of at least the first background color and the second background color.

16. The diffractive pigment composition of claim 15, wherein the first diffractive structure is different than the second diffractive structure.

17. The diffractive pigment composition of claim 15, wherein the first type of diffractive pigment flakes have a different quarter-wave optical thickness than the second type of diffractive pigment flakes.

18. The diffractive pigment composition of claim 15, wherein the one or more first dielectric layers of the first flake have a different physical thickness than the one or more second dielectric layers of the second flake.

19. The diffractive pigment composition of claim 15, further comprising:

a plurality of diffractive pigment flakes of a third type of diffractive pigment flakes, wherein a third flake of the third type of diffractive pigment flakes includes one or more third dielectric layers and a third diffractive structure, and wherein the one or more third dielectric layers of the third flake have a different physical thickness than the one or more first dielectric layers of the first flake and the one or more second dielectric layers of the second flake.

20. The diffractive pigment composition of claim 15, wherein the one or more first dielectric layers of at least of the first flake are a plurality of dielectric layers, and wherein the plurality of dielectric layers include alternating layers of high-index dielectric material and low-index dielectric material.

* * * * *